(12) United States Patent
Dunlavy

(10) Patent No.: US 11,535,687 B2
(45) Date of Patent: *Dec. 27, 2022

(54) SILICA-FILLED RUBBER COMPOSITION AND METHOD FOR MAKING THE SAME

(75) Inventor: Maryangel G. Dunlavy, Ravenna, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/353,723

(22) PCT Filed: Jul. 25, 2012

(86) PCT No.: PCT/US2012/048125
§ 371 (c)(1),
(2), (4) Date: Apr. 23, 2014

(87) PCT Pub. No.: WO2013/062648
PCT Pub. Date: May 2, 2013

(65) Prior Publication Data
US 2015/0031792 A1 Jan. 29, 2015

Related U.S. Application Data

(60) Provisional application No. 61/550,475, filed on Oct. 24, 2011.

(51) Int. Cl.
| | | |
|---|---|---|
| C08F 36/06 | (2006.01) |
| C08K 3/36 | (2006.01) |
| B60C 1/00 | (2006.01) |
| C08K 5/548 | (2006.01) |
| C08L 17/00 | (2006.01) |
| C08L 91/00 | (2006.01) |
| C08L 91/06 | (2006.01) |
| C08L 9/06 | (2006.01) |
| C08K 3/04 | (2006.01) |

(52) U.S. Cl.
CPC ............... *C08F 36/06* (2013.01); *B60C 1/00* (2013.01); *B60C 1/0016* (2013.01); *C08K 3/36* (2013.01); *C08K 5/548* (2013.01); *C08L 9/06* (2013.01); *C08L 17/00* (2013.01); *C08L 91/00* (2013.01); *C08L 91/06* (2013.01); *C08K 3/04* (2013.01)

(58) Field of Classification Search
CPC .. C08K 3/04; C08K 3/36; C08K 5/548; C08F 36/06; B60C 1/00; B60C 1/0016; C08L 17/00; C08L 91/00; C08L 91/06; C08L 9/06
USPC ........................................................ 523/157
See application file for complete search history.

(56) References Cited

U.S. PATENT DOCUMENTS

| | | | |
|---|---|---|---|
| 422,933 A | 3/1890 | Green | |
| 3,014,005 A | 12/1961 | Howland et al. | |
| 3,350,345 A | 10/1967 | Vanderbilt et al. | |
| 3,546,185 A | 12/1970 | Coran et al. | |
| 3,768,537 A | 10/1973 | Hess et al. | |
| 3,801,557 A | 4/1974 | Langsam | |
| 3,842,111 A | 10/1974 | Meyer-Simon et al. | |
| 3,852,250 A | 12/1974 | Maxey | |
| 3,873,489 A | 3/1975 | Thurn et al. | |
| 3,938,574 A | 2/1976 | Burmester et al. | |
| 3,957,718 A | 5/1976 | Pochert et al. | |
| 3,978,103 A | 8/1976 | Meyer-Simon et al. | |
| 3,981,943 A * | 9/1976 | Fujio et al. ................... | 525/259 |
| 3,997,356 A | 12/1976 | Thurn et al. | |
| 4,002,594 A | 1/1977 | Fetterman | |
| 4,044,037 A | 8/1977 | Mui et al. | |
| 4,076,550 A | 2/1978 | Thurn et al. | |
| 4,089,820 A | 5/1978 | Wright | |
| 4,099,981 A | 7/1978 | Mui et al. | |
| 4,128,438 A | 12/1978 | Wolff et al. | |
| 4,150,010 A | 4/1979 | Itoh et al. | |
| 4,222,915 A | 9/1980 | Wolff et al. | |
| 4,226,926 A | 10/1980 | Goldberg et al. | |
| 4,229,333 A | 10/1980 | Wolff et al. | |
| 4,271,050 A | 6/1981 | Maender et al. | |
| 4,278,587 A | 7/1981 | Wolff et al. | |
| 4,292,234 A | 9/1981 | Borel | |
| 4,297,145 A | 10/1981 | Wolff et al. | |
| 4,324,710 A | 4/1982 | Davis et al. | |

(Continued)

FOREIGN PATENT DOCUMENTS

| | | |
|---|---|---|
| CN | 1318086 A | 10/2001 |
| CN | 1501959 A | 6/2004 |

(Continued)

OTHER PUBLICATIONS

Informaton on Rubber, pp. 1-2, obtained online from http://www.merl-ltd.co.uk/2003_materials/rubber11a.shtml, no publication date given.*
RT Vanderbilt Co. Inc.—VANA PDG pp. 1-2, Sep. 11, 1986, obtained online from: http://www.hmdb.ca/system/metabolites/msds/000/001/138/original/HMDB01270.pdf?1358462196.*
Butadiene Rubber, pp. 1-2, no publication date given, obtained online from: https://www.tut.fi/ms/muo/tyreschool/moduulit/moduuli_6/hypertext/2/2_3.html.*
STN Search Report, pp. 1-3, dated Aug. 2016.*

(Continued)

*Primary Examiner* — Alexander C Kollias
(74) *Attorney, Agent, or Firm* — Meredith E. Hooker; Jenny L. Sheaffer

(57) ABSTRACT

Disclosed is a method of preparing a rubber composition comprising the steps of (a) blending in at least one preparatory mixing step at least one natural or synthetic rubbery polymer, a silica filler, a silica coupling agent, and at least one vulcanization accelerator; and (b) subsequently blending therewith in a final mixing step a sulfur curative, wherein the average glass transition temperature of the polymer(s) is −55° C. or less.

14 Claims, No Drawings

(56) References Cited

U.S. PATENT DOCUMENTS

| | | | |
|---|---|---|---|
| 4,374,943 A | 2/1983 | Williams | |
| 4,376,184 A | 3/1983 | Itoh et al. | |
| 4,391,953 A | 7/1983 | Morita | |
| 4,400,485 A | 8/1983 | Mukamal et al. | |
| 4,419,470 A | 12/1983 | Davis et al. | |
| 4,430,466 A | 2/1984 | Cooper | |
| 4,433,114 A | 2/1984 | Coran et al. | |
| 4,455,399 A | 6/1984 | Lee | |
| 4,482,663 A | 11/1984 | Kraus | |
| 4,491,655 A | 1/1985 | Sandstrom | |
| 4,512,962 A * | 4/1985 | Matsuura | C08K 9/12 |
| | | | 106/14.33 |
| 4,517,336 A | 5/1985 | Wolff et al. | |
| 4,522,970 A | 6/1985 | Seriver et al. | |
| 4,587,296 A | 5/1986 | Moniotte | |
| 4,595,781 A | 6/1986 | Morita | |
| 4,621,121 A | 11/1986 | Schwarze et al. | |
| 4,681,961 A | 7/1987 | Zerpner et al. | |
| 4,704,425 A | 11/1987 | Lagarde et al. | |
| 4,714,733 A | 12/1987 | Itoh et al. | |
| 4,788,229 A | 11/1988 | Bohm et al. | |
| 4,808,714 A | 2/1989 | Stieber | |
| 4,820,751 A | 4/1989 | Takeshita et al. | |
| 4,977,200 A | 12/1990 | Itoh et al. | |
| 5,006,603 A | 4/1991 | Takaki et al. | |
| 5,023,301 A | 6/1991 | Burlett et al. | |
| 5,082,901 A | 1/1992 | Linster | |
| 5,087,668 A | 2/1992 | Standstrom et al. | |
| 5,093,426 A | 3/1992 | Sakabe et al. | |
| 5,116,886 A | 5/1992 | Wolff et al. | |
| 5,153,076 A | 10/1992 | Jadamus et al. | |
| 5,227,425 A | 7/1993 | Rauline | |
| 5,232,977 A | 8/1993 | Carter et al. | |
| 5,272,213 A | 12/1993 | Knowles et al. | |
| 5,292,815 A | 3/1994 | Wreesmann et al. | |
| 5,300,577 A | 4/1994 | DiRossi et al. | |
| 5,328,949 A | 7/1994 | Sandstrom et al. | |
| 5,336,730 A | 8/1994 | Sandstrom et al. | |
| 5,349,020 A | 9/1994 | Okada et al. | |
| 5,396,940 A | 3/1995 | Segatta et al. | |
| 5,399,739 A | 3/1995 | French et al. | |
| 5,401,789 A | 3/1995 | Wolff et al. | |
| 5,407,989 A | 4/1995 | Davis et al. | |
| 5,440,064 A | 8/1995 | Agostini et al. | |
| 5,447,971 A | 9/1995 | Bergh et al. | |
| 5,462,979 A | 10/1995 | Sandstrom | |
| 5,504,137 A | 4/1996 | Sandstrom et al. | |
| 5,504,140 A | 4/1996 | Zanzig et al. | |
| 5,534,574 A | 7/1996 | Sandstrom et al. | |
| 5,534,599 A | 7/1996 | Sandstrom et al. | |
| 5,580,916 A | 12/1996 | Traverso et al. | |
| 5,580,919 A | 12/1996 | Agostini et al. | |
| 5,639,320 A | 6/1997 | Oare et al. | |
| 5,652,310 A | 7/1997 | Hsu et al. | |
| 5,663,225 A | 9/1997 | Ishida et al. | |
| 5,674,932 A * | 10/1997 | Agostini | B60C 1/0016 |
| | | | 524/430 |
| 5,686,530 A * | 11/1997 | Halasa et al. | 525/99 |
| 5,747,601 A | 5/1998 | Broussard et al. | |
| 5,855,976 A | 1/1999 | Oyama et al. | |
| 5,861,465 A | 1/1999 | Hamada et al. | |
| 5,916,956 A * | 6/1999 | Wang et al. | 524/495 |
| 5,939,493 A | 8/1999 | Hojo | |
| 6,021,831 A | 2/2000 | Yamauchi et al. | |
| 6,044,882 A | 4/2000 | Crawford et al. | |
| 6,121,367 A | 9/2000 | Corvasce et al. | |
| 6,162,875 A | 12/2000 | Virdi | |
| 6,172,154 B1 | 1/2001 | Brown et al. | |
| 6,197,868 B1 | 3/2001 | Okamura et al. | |
| 6,232,394 B1 | 5/2001 | Bonhomme et al. | |
| 6,242,522 B1 | 6/2001 | Ezawa et al. | |
| 6,287,230 B1 | 9/2001 | Okuno | |
| 6,291,572 B1 | 9/2001 | Brown et al. | |
| 6,303,683 B1 | 10/2001 | Figovsky | |
| 6,355,719 B1 | 3/2002 | Corvasce et al. | |
| 6,365,663 B2 | 4/2002 | Mabry et al. | |
| 6,409,959 B1 | 6/2002 | Caretta et al. | |
| 6,420,488 B1 * | 7/2002 | Penot | C08K 5/17 |
| | | | 252/183.14 |
| 6,465,604 B2 | 10/2002 | Lin et al. | |
| 6,469,104 B1 | 10/2002 | Colvin et al. | |
| 6,517,653 B2 | 2/2003 | Hahn | |
| 6,521,691 B1 | 2/2003 | Agostini et al. | |
| 6,531,546 B2 | 3/2003 | Oka et al. | |
| 6,536,492 B2 | 3/2003 | Vasseur | |
| 6,555,606 B1 | 4/2003 | Agostini et al. | |
| 6,646,029 B1 | 11/2003 | Lin et al. | |
| 6,797,779 B1 | 9/2004 | Ajbani et al. | |
| 6,849,674 B2 | 2/2005 | Yatsuyanagi et al. | |
| 6,916,888 B2 | 7/2005 | Yatsuyanagi et al. | |
| 6,939,921 B2 | 9/2005 | Waddell et al. | |
| 6,951,897 B2 | 10/2005 | Penot | |
| 6,982,050 B2 | 1/2006 | Chauvin et al. | |
| 6,984,450 B2 | 1/2006 | Menting et al. | |
| 6,984,683 B2 | 1/2006 | Luginsland et al. | |
| 6,984,689 B2 | 1/2006 | Penot et al. | |
| 7,005,483 B2 | 2/2006 | Chang et al. | |
| 7,153,895 B2 | 12/2006 | Hochheiser et al. | |
| 7,271,208 B2 | 9/2007 | Lin et al. | |
| 7,309,970 B2 | 12/2007 | Gao | |
| 7,326,748 B2 | 2/2008 | Ajbani et al. | |
| 7,351,763 B2 | 4/2008 | Linster et al. | |
| 7,441,574 B2 | 10/2008 | Koster et al. | |
| 7,451,529 B2 | 11/2008 | Waddell et al. | |
| 7,491,767 B2 | 2/2009 | Durel et al. | |
| 7,528,181 B2 | 5/2009 | Bailey et al. | |
| 7,605,205 B2 | 10/2009 | Gong et al. | |
| 7,671,132 B1 | 3/2010 | Thielen et al. | |
| 7,687,559 B2 | 3/2010 | Kim | |
| 7,700,705 B2 | 4/2010 | Jole | |
| 7,799,870 B2 | 9/2010 | Hergenrother et al. | |
| 7,836,928 B2 | 11/2010 | Hogan et al. | |
| 7,897,694 B2 | 3/2011 | Rajagopalan et al. | |
| 7,968,630 B2 | 6/2011 | Kanz et al. | |
| 7,968,631 B2 | 6/2011 | Kanz et al. | |
| 7,989,541 B2 | 8/2011 | Figovsky | |
| 8,076,404 B2 | 12/2011 | Woolard et al. | |
| 8,710,140 B2 | 4/2014 | Pialot | |
| 2001/0034389 A1 * | 10/2001 | Vasseur | C08K 5/31 |
| | | | 524/137 |
| 2002/0077408 A1 | 6/2002 | Rauline | |
| 2002/0115767 A1 | 8/2002 | Cruse et al. | |
| 2003/0105242 A1 * | 6/2003 | Penot | C08K 5/29 |
| | | | 525/332.6 |
| 2003/0127169 A1 | 7/2003 | Hergenrother et al. | |
| 2003/0144394 A1 * | 7/2003 | Penot | C08K 5/3432 |
| | | | 524/262 |
| 2004/0030036 A1 | 2/2004 | Waddell | |
| 2004/0106743 A1 | 6/2004 | Chauvin et al. | |
| 2004/0132880 A1 | 7/2004 | Durel et al. | |
| 2004/0152811 A1 | 8/2004 | Lin et al. | |
| 2004/0157957 A1 * | 8/2004 | Ganapathiappan et al. | 523/160 |
| 2004/0192852 A1 | 9/2004 | Stieber et al. | |
| 2005/0004297 A1 * | 1/2005 | Durel | C08K 3/36 |
| | | | 524/493 |
| 2005/0016651 A1 * | 1/2005 | Durel | C08K 9/12 |
| | | | 152/209.1 |
| 2005/0059773 A1 * | 3/2005 | Tardivat | B60C 1/00 |
| | | | 524/588 |
| 2005/0080179 A1 | 4/2005 | Kim | |
| 2005/0282013 A1 | 12/2005 | Menting et al. | |
| 2005/0282960 A1 | 12/2005 | Chang et al. | |
| 2006/0116457 A1 * | 6/2006 | Cambon | B60C 1/0016 |
| | | | 524/261 |
| 2006/0253956 A1 | 11/2006 | Lipinski | |
| 2006/0257674 A1 | 11/2006 | Lipinski et al. | |
| 2007/0037916 A1 * | 2/2007 | Watanabe et al. | 524/493 |
| 2007/0037929 A1 | 2/2007 | Joo et al. | |
| 2007/0042115 A1 | 2/2007 | Giza | |
| 2007/0051447 A1 | 3/2007 | Kanz et al. | |
| 2007/0299197 A1 | 12/2007 | Lin | |
| 2008/0009569 A1 | 1/2008 | Kanz et al. | |
| 2008/0303189 A1 | 12/2008 | Joie | |

(56) References Cited

U.S. PATENT DOCUMENTS

| | | |
|---|---|---|
| 2008/0306213 A1 | 12/2008 | Jiang et al. |
| 2009/0054595 A1 | 2/2009 | Cornish et al. |
| 2009/0209699 A1 | 8/2009 | Weinreich |
| 2010/0105805 A1 | 4/2010 | Sasaka |
| 2010/0190885 A1* | 7/2010 | Hua ............... B60C 1/0016 523/152 |
| 2010/0200814 A1 | 8/2010 | Marui et al. |
| 2010/0292370 A1 | 11/2010 | Woolard et al. |
| 2010/0311914 A1 | 12/2010 | Bosch |
| 2011/0180195 A1 | 7/2011 | Hergenrother et al. |
| 2011/0213050 A1 | 9/2011 | Pialot et al. |
| 2011/0275751 A1 | 11/2011 | Costantini et al. |
| 2011/0281703 A1 | 11/2011 | Tajima et al. |
| 2011/0287254 A1 | 11/2011 | Lipinski |
| 2013/0331480 A1 | 12/2013 | Bridgestone |

FOREIGN PATENT DOCUMENTS

| | | |
|---|---|---|
| EP | 0100434 A2 | 2/1984 |
| EP | 0232463 A2 | 8/1987 |
| EP | 0333317 A1 | 9/1989 |
| EP | 0638610 A1 | 2/1995 |
| EP | 0803535 A2 | 10/1997 |
| EP | 2679626 A1 | 1/2014 |
| GB | 757764 A | 9/1956 |
| GB | 1439247 A | 6/1976 |
| GB | 1487100 A | 9/1977 |
| GB | 1551382 A | 8/1979 |
| JP | H04-261446 A | 9/1992 |
| JP | H10152581 A | 6/1998 |
| JP | 2002521516 A | 7/2002 |
| JP | 2005-272768 A | 8/2002 |
| JP | 2009-074069 A | 10/2005 |
| JP | 2006028430 A | 2/2006 |
| JP | 2007039499 | 2/2007 |
| JP | 2007039503 A | 2/2007 |
| JP | 2007070451 A | 3/2007 |
| JP | 2007-154130 A | 6/2007 |
| JP | 2007154130 A | 6/2007 |
| JP | 2002-220491 A | 4/2009 |
| JP | 2010-065126 A | 3/2020 |
| WO | 00/005301 A1 | 2/2000 |
| WO | 0026279 | 5/2000 |
| WO | 2008123306 A1 | 10/2008 |
| WO | 2010/126500 A1 | 11/2010 |
| WO | 2011031437 A1 | 3/2011 |
| WO | 2013062648 A1 | 5/2013 |

OTHER PUBLICATIONS

Fred W. Billmeyer, Jr, "Textbook of Polymer Science, 3rd Edition" John Wiley & Sons, Inc., New York p. 339 (1984).*
Budene 1207/1208 Product Data Sheet, Goodyear Chemical, p. 1, Oct. 1, 2012.*
STN Search Report, pp. 1-4, dated Aug. 1, 2016.*
STN Search Report, pp. 1-6, dated Jul. 18, 2019.*
Ha, Seung Kyu, International Search Report with Written Opinion from PCT/US2012/048125, 8 pp. (dated Feb. 7, 2013).
Ha, Seung Kyu, International Search Report with Written Opinion from PCT/US2012/048130, 8 pp. (dated Feb. 7, 2013).
Klockmann, O., Friehmelt, R Hasse, A., and Korch, A., Advanced Silica Silane Mixing—turning accelerators into process aids, Presentation from Evonik, Sth Fall Rubber Colloquium, Hanover, Nov. 28, 2008.
Mihara, Satoshi, Reactive Processing of Silica-Reinforced Tire Rubber: New Insight into The Time-And Temperature-Dependence of Silica Rubber Interaction, Ph.D thesis, University of Twente, Enschede, the Netherlands, 2009.
"Rubber Processing Basic Technology", Personnel and Education Department, Ministry of Chemical Industry, Chemical Industry Press, pp. 33-34, Jul. 31, 1997.
Yi, Jia et al., "Practical Technology of Rubber Processing", Chemical Industry Press, p. 316, Feb. 29, 2004.
Chinese Office Action with English Translation from 201280052219. 5, 19 pp. (dated Mar. 23, 2015).
Loadman, John, "Tears of the Tree—The Store of Rubber—A Modern Marvel", Oxford University Press, 9 pp. (2005).
EPA Article, undated, Section 4.12 Manufacture of Rubber Products, 20 pp.
Momentive Performance Materials, "NXT* Silane—coupling agent for silica-reinforced tire tread compounds", 8 pp. (March, 2007).
Wolff, S., Rubber Chemical Technology, Optimization of Silane-Silica OTR Compounds, Part 1: Variations of Mixing Temperature and Time During the Modification of Silica with BIS-(3-Triethoxisilylpropyl)-Tetrasulfide, vol. 55, 23 pp. (Oct. 13-16, 1981).
Response to Office Action from U.S. Appl. No. 14/353,723, 17 pp. (dated May 12, 2015).
Japanese Office Action with English Translation from 2014-538787, pp. (dated Mar. 24, 2015).
Russell, Graham, European Search Report with opinion from European Application No. 12843697.9, 8 pp. (dated May 11, 2015).
Nakayama, Motoshi, Japanese Office Action with English Translation from Japanese Application No. 2014-538788, 6 pp. (dated Mar. 3, 2015).
Chinese Patent Office, Chinese Office Action with English Translation from Chinese Application No. 201280059609.5, 11 pp., (dated Jan. 19, 2015).
Office Action in JP application No. 2014-538788, dated Sep. 1, 2015.
Extended European Search Report and Opinion from EP 12,843,697, dated May 11, 2015.
Final office action in U.S. Appl. No. 14/353,740 dated Jul. 8, 2015.
Response filed in U.S. Appl. No. 14/353,740 on May 26, 2015.
Seacon Corporation, Product Guide, 2011.
Nocil Limited, Vulcanization Accelerators download, Dec. 2010.
STN Search Report, pp. 1-4, no date provided, cited in U.S. Appl. No. 14/353,723.
ChemSpider—1,3-Diphenylguanidine, pp. 1-3, no publication dated given, printed Feb. 10, 2015, cited in U.S. Appl. No. 14/353,723.
Loadman, M.J.R., "The Glass Transition Temperature of Natural Rubber," Journal of Thermal Analysis, vol. 30, No. 4, Jul. 1985, pp. 929-941, XP002749545, DOI: 10.1007/BF01913321.
Extended European Search Report from European Patent Application 12844112.8, dated Dec. 11, 2015.
European Search Opinion from European Patent Application 12844112. 8, dated Dec. 11, 2015.
Office Action from Japanese Patent Application 2014-538787, dated Nov. 10, 2015.
Hao, Pham Thi et al., "Study of Two Types of Styrene Butadiene Rubber in Tire Tread Compounds," Polymer Testing, vol. 20, 2001, pp. 539-544, XP002751152.
Duradene® Typical Properties, May 2009, available at http://www.firesyn.com/duradene_tires.asp (last accessed Jan. 5, 2016).
Lanxess functionalized SBR, available at http://lanxess.com/en/products/solution-vinyl-styrene-butadiene-rubber-ssbr/ (copyright 2015, last accessed Jan. 5, 2016).
Lanxess Buna SBR, available at http://tsr.lanxess.com/en/products/solution-vinyl-styrene-butadiene-rubber-sbr/?type=98 (copyright 2015, last accessed Jan. 5, 2016).
Office Action in application CN 201280052219.5 (dated Sep. 18, 2015).
Third Office Action from application CN2012-80052219.5 (dated Mar. 4, 2016).
Response filed in European Patent Application 12844112.8 (dated Feb. 24, 2016).
Rejection Decision from application CN2012-80052219.5 (dated Jul. 29, 2016).
Response filed in U.S. Appl. No. 14/353,740 on Sep. 8, 2015.
Non-Final Office Action from U.S. Appl. No. 14/353,740 dated Aug. 19, 2016.
Response filed in European U.S. Appl. No. 12/843,697 on Aug. 7, 2015.
Office Action issued in application JP2014-538787 (dated Sep. 2017).

(56) References Cited

OTHER PUBLICATIONS

Office Action issued in application JP2014-538787 (dated May 2017).
Office Action issued in application CN201280052219.5 (dated Jul. 2017).
Office Action issued in application EP12843697.9 (dated Mar. 2017).
Response filed in application EP12843697.9 (filed Apr. 2017).
Office action issued in U.S. Appl. No. 14/353,470 (dated Sep. 2016).
Response filed in U.S. Appl. No. 14/353,470 (filed Aug. 2016).
Office action issued by Brazilian Patent Office in Brazil counterpart application BR112014009780-1, dated Apr. 2021.
Office action communication from European Patent Office in EP counterpart application 12844112.8, dated Nov. 2019.
Response filed at European Patent Office in EP counterpart application 12844112.8, filed Mar. 2020.
Office action communication from European Patent Office in EP counterpart application 12844112.8, dated Jan. 2021.
Response filed at European Patent Office in EP counterpart application 12844112.8, filed Mar. 2021.
Intent to Grant communication from European Patent Office in EP counterpart application 12844112.8, issued May 2021.
Office action issued by Brazilian Patent Office in Brazil counterpart application BR112014009780-1, dated Oct. 2019.
Decision from Japanese Patent Office in Japanese counterpart application JP2014-538787, dated Mar. 2018.

\* cited by examiner

SILICA-FILLED RUBBER COMPOSITION AND METHOD FOR MAKING THE SAME

FIELD OF THE DISCLOSURE

This disclosure generally relates to a silica-filled rubber composition, and a method of making the same.

BACKGROUND

Reinforcing fillers, such as carbon black and silica, are commonly introduced to confer certain favorable mechanical properties to cured rubber compositions. When used alone or in combination with carbon black, silica reinforcement may provide improved traction characteristics and rolling resistance when applied in tire components.

Rubber compositions containing silica are generally prepared in at least two mixing stages—at least one prepatory mixing step in which polymers, fillers, coupling agents, plasticizers, and the like are kneaded together, and a final mixing step in which vulcanization agents such as curatives and vulcanization accelerators are added. In practice, addition of vulcanization accelerators in any preparatory mixing stage is generally disfavored to avoid premature vulcanization.

SUMMARY

Disclosed is a method of preparing a rubber composition comprising:
a. blending in at least one preparatory mixing step
    (i) at least one natural or synthetic rubbery polymer,
    (ii) a silica filler,
    (iii) a silica coupling agent, and
    (iv) at least one vulcanization accelerator; and
b. subsequently blending therewith in a final mixing step a sulfur curative,
wherein the average glass transition temperature of the polymer(s) is −55° C. or less.

Also disclosed is a rubber composition produced by a method comprising:
a. blending in at least one preparatory mixing step
    (i) at least one natural or synthetic rubbery polymer,
    (ii) a silica filler,
    (iii) a silica coupling agent, and
    (iv) at least one vulcanization accelerator; and
b. subsequently blending therewith in a final mixing step a sulfur curative,
wherein the average glass transition temperature of the polymer(s) is −55° C. or less.

Further disclosed is a tire tread comprising a rubber composition produced by a method comprising:
a. blending in at least one preparatory mixing step
    (i) at least one natural or synthetic rubbery polymer,
    (ii) a silica filler,
    (iii) a silica coupling agent, and
    (iv) at least one vulcanization accelerator; and
b. subsequently blending therewith in a final mixing step a sulfur curative,
wherein the average glass transition temperature of the polymer(s) is −55° C. or less.

Other aspects of the present disclosure will be apparent to the ordinarily skilled artisan from the description that follows. To assist in understanding the description of various embodiments that follow, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"copolymer" means a polymer that includes mer units derived from two reactants, typically monomers, and is inclusive of random, block, segmented, graft, gradient, etc., copolymers; and "phr" means parts by weight of a referenced material per 100 parts by weight rubber, and is a recognized term by those having skill in the rubber compounding art.

The terms "rubber composition" and "rubber compound" may be used interchangeably.

All references incorporated herein by reference are incorporated in their entirety unless otherwise stated.

DETAILED DESCRIPTION

Disclosed is a method of preparing a rubber composition comprising the steps of (a) blending in at least one preparatory mixing step at least one natural or synthetic rubbery polymer, a silica filler, a silica coupling agent, and at least one vulcanization accelerator; and (b) subsequently blending therewith in a final mixing step a sulfur curative, wherein the average glass transition temperature of the polymer(s) is −55° C. or less.

The natural or synthetic rubbery polymer can be any polymer suitable for use in a cap ply rubber composition. Examples of rubbery polymers that may be used in the compositions described herein include, but are not limited to, natural rubber, synthetic polyisoprene rubber, styrene-butadiene rubber (SBR), styrene-isoprene rubber, styrene-isoprene-butadiene rubber, butadiene-isoprene-styrene terpolymer, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epichlorohydrin rubber, chlorinated polyethylene-propylene rubbers, chlorosulfonated polyethylene rubber, hydrogenated nitrile rubber, and terafluoroethylene-propylene rubber. A mixture of rubbery polymers may be used.

The rubber composition contains a silica filler. Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, in an amount of about 5 to about 80 phr, or alternatively in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

In addition to the silica filler, carbon black may also be added to the rubber composition. The carbon black is typically added in at least one preparatory mixing step.

Carbon black, when present, may be used in an amount of about 1 to about 200 phr, in an amount of about 5 to about 100 phr, or alternatively in an amount of about 30 to about 80 phr. Suitable carbon blacks include commonly available, commercially-produced carbon blacks, but those having a surface area of at least 20 m$^2$/g, or preferably, at least 35 m$^2$/g up to 200 m$^2$/g or higher are preferred. Among useful carbon blacks are furnace blacks, channel blacks, and lamp blacks. A mixture of two or more carbon blacks can be used. Exemplary carbon blacks include, but are not limited to, N-110, N-220, N-339, N-330, N-352, N-550, N-660, as designated by ASTM D-1765-82a.

If the rubber composition contains a blend of silica filler and carbon black, the ratio of silica to carbon black may range from about 0.1:1 to about 10:1, or from about 1:1 to about 10:1, or from about 5:1 to about 10:1.

The surface of the carbon black and/or silica may optionally be treated or modified to improve the affinity to particular types of polymers. Such surface treatments and modifications are well known to those skilled in the art.

Additional fillers may also be utilized, including but not limited to, mineral fillers, such as clay, talc, aluminum hydrate, aluminum hydroxide and mica. The foregoing additional fillers are optional and can be utilized in varying amounts from about 0.5 phr to about 40 phr.

The total amount of filler may be from about 1 to about 200 phr, alternatively from about 5 to about 100 phr, from about 10 phr to about 30 phr, from about 30 to about 80 phr, or from about 40 to about 70 phr.

A silica coupling agent is used to couple the silica to the rubbery polymer. Numerous coupling agents are known, including but not limited to organosulfide polysulfides and organoalkoxymercaptosilanes. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl) trisulfide, 3,3'-bis(methylbutylethoxysilylpropyl)tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane. Such organoalkoxymercaptosilanes may be capped with a blocking group, i.e., the mercapto hydrogen atom is replaced with another group. A representative example of a capped organoalkoxymercaptosilane coupling agent is a liquid 3-octanoyl-thio-1-propyltriethoxysilane, commercially available as NXT™ Silane from Momentive Performance Materials Inc.

Mixtures of various organosilane polysulfide compounds and organoalkoxymercaptosilanes can be used.

The amount of coupling agent in the rubber composition is the amount needed to produce acceptable results, which is easily determined by one skilled in the art. The amount of coupling agent is typically based on the weight of the silica in the composition, and may be from about 0.1% to about 20% by weight of silica, from about 1% to about 15% by weight of silica, or alternatively from about 1% to about 10% by weight of silica.

Other ingredients that may be added to the rubber composition include, but are not limited to, oils, waxes, scorch inhibiting agents, tackifying resins, reinforcing resins, fatty acids such as stearic acid, and peptizers. These ingredients are known in the art, and may be added in appropriate amounts based on the desired physical and mechanical properties of the rubber composition.

A vulcanizing agent is addeded to the rubber composition. Suitable vulcanizing agents are known in the art, and may be added in appropriate amounts based on the desired physical, mechanical, and cure rate properties of the rubber composition. Examples of vulcanizing agents include sulfur and sulfur donating compounds. The amount of the vulcanizing agent used in the rubber composition may, in certain embodiments, be from about 0.1 to about 10 phr, or from about 1 to about 5 parts by weight per 100 phr.

At least one vulcanization accelerator is added to the rubber composition. The type of vulcanization accelerator is not particularly limited. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio) benzothiazole (MBS), N-tert-butyl-2-benzothiazole sulfonamide (TBBS), N-cyclohexyl-2-benzothiazole sulfonamide (CBS), and mixtures thereof. The total amount of vulcanization accelerator(s) used in the rubber composition may be from about 0.1 to about 10 phr or from about 1 to about 5 phr.

The rubber composition may be formed by mixing the ingredients together by methods known in the art, such as, for example, by kneading the ingredients together in a Banbury mixer.

As mentioned herein above, the rubber composition is formed by mixing the ingredients together in at least two mixing steps: at least one prepatory mixing step and a final mixing step. A prepatory mixing step is one in which no vulcanization agent, such as sulfur, is added. In the prepatory mixing step(s), the ingredients may be mixed to a temperature of about 140° C. to about 190° C., or to a temperature of about 150° C. to about 180° C., or alternatively to a temperature of about 160° C. to about 175° C. If more than one prepatory mixing step is utilized, the temperatures of the prepatory mixing steps may be the same or different.

A final mixing step is one in which a vulcanizing agent, such as sulfur, is added. The final mixing step may further contain vulcanization accelerators. The final mixing step may be mixed to a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

The composition is preferably allowed to cool to a temperature of 50° C. or lower between individual mixing steps.

One aspect of this disclosure is the fact that at least one vulcanization accelerator is added to to the rubber composition during a prepatory mixing step. Suitable vulcanization accelerators that may be added during a prepatory mixing step are not limited, and include the vulcanization accelerators mentioned herein above. In one embodiment, the vulcanization accelerator that is added in a prepatory mixing step is selected from the group consisting of diphenyl guanidine (DPG), tetrabutylthiuram disulfide (TBTD), benzothiazyl disulfide (MBTS), N-tert-butyl-2-benzothiazole sulfonamide (TBBS), N-cyclohexyl-2-benzothiazole sulfonamide (CBS), and mixtures thereof. In another embodiment, the vulcanization accelerator added during a prepatory mixing step is diphenyl guanidine (DPG).

The preparatory mixing step in which a vulcanization accelerator is added may be the same mixing step in which the polymer(s), silica, silica coupling agent, oil(s), and other ingredients are added. In one embodiment, the preparatory mixing step containing the vulcanization accelerator is a mixing step in which only a vulcanization accelereator is added, and is conducted after all polymer(s), silica, and silica coupling agent has been added. In another embodiment, all processing aids, stearic acid, and antidegradants such as N-(1,3-dimethylbutyl)-N'-phenyl-p-phenylene-diamine (6PPD), are added in a subsequent mixing stage to the preparatory mixing stage containing a vulcanization accelerator.

The amount of vulcanization accelerator added during the preparatory mixing step may vary, and may depend on the amount of silica filler and silica coupling agent. The amount of vulcanization accelerator added during a preparatory mixing stage may be from about 0.01 to about 5 phr, or from about 0.01 to about 3 phr, or from about 0.1 to about 1 phr. In one embodiment, at least one vulcanization accelerator is added during a prepatory mixing step, and at least one vulcanization accelerator is added during the final mixing stage. The vulcanization accelerator added during the final mixing stage may be the same as or different from the accelerator added during the preparatory mixing stage. In another embodiment, all of the vulcanization accelerators may be added during a preparatory mixing stage, meaning no vulcanization accelerator is added during the final mixing stage. The total amount of vulcanization accelerator(s) used in the rubber composition may be from about 0.1 to about 10 phr or from about 1 to about 5 phr.

Another aspect of this disclosure is that the average glass transition temperature (Tg) of the polymer(s) is −55° C. or less. The Tg is determined by a differential scanning calorimeter (DSC) at a rate of temperature increase of 20° C./min and calculated by the midpoint method, a method which is well known to persons skilled in the art. The average Tg of the polymers is a weighted average, thus accounting for the amount of each polymer in the rubber composition. For example, a rubber composition containing 70 phr of a polymer having a Tg of −20° C. and 30 phr of a polymer having a Tg of −60° C. has an average polymer Tg of −32° C. (((70 phr X −20° C.)+(30 phr X −60° C.))/100 phr). In one embodiment, the average Tg of the polymer(s) is −60° C. or less.

Without intending to be bound by theory, it is believed that the addition of a vulcanization accelerator in a preparatory mixing stage catalyzes the silanization reaction between the silica coupling agent and the rubbery polymer. It has unexpectedly been found that the affects of the improved silanization reaction are impacted by the average Tg of the polymer(s) in the rubber composition. For example, if the rubber composition is used as a tire tread composition, it has been found that when the average Tg of the polymer(s) in the rubber composition is −55° C. or less, the snow traction of the tread may be improved by the addition of a vulcanization accelerator in a preparatory mixing step.

The rubber composition formed according to the disclosure herein is particularly useful as a tire tread rubber composition. However, in certain embodiments, it may be used as another tire component, such as a sidewall, bead filler, undertread, or a coating for a carcass ply. Additionally, other rubber articles may be formed from the rubber composition of the disclosure, such as an air spring component.

The present disclosure will be described in more detail with reference to the following examples. The following examples are presented for purposes of illustration only and are not to be construed in a limiting sense.

EXAMPLES

Eight rubber compositions were prepared from the ingredients shown in Table 1. All amounts shown are in phr. Samples A, B, C, and D were mixed in two mixing steps in a Banbury type mixer—a preparatory mixing step and a final mixing step. The ingredients in the preparatory mixing stage were mixed to a temperature of about 175° C. before being dropped from the mixer, while the ingredients in the final mixing step were mixed to a temperature of about 110° C. before being dropped from the mixer.

Samples A', B', C', and D' were mixed in three mixing stages—two preparatory mixing steps and a final mixing step. The ingredients in each preparatory mixing step were mixed to a temperature of about 175° C. before being dropped from the mixer, while the ingredients in the final mixing step were mixed to a temperature of about 110° C. before being dropped from the mixer.

TABLE 1

|  | A | A' | B | B' | C | C' | D | D' |
|---|---|---|---|---|---|---|---|---|
| First Preparatory Mixing Step | | | | | | | | |
| SBR (−22° C. Tg) | 60 | 60 | 40 | 40 | 29.5 | 29.5 | 17.5 | 17.5 |
| SBR (−69° C. Tg) | 40 | 40 | 60 | 60 | 70.5 | 70.5 | 82.5 | 82.5 |
| Devulcanized Rubber | 5 | 5 | 5 | 5 | 5 | 5 | 5 | 5 |
| Carbon Black | 7 | 7 | 7 | 7 | 7 | 7 | 7 | 7 |
| Silica | 63 | 63 | 63 | 63 | 63 | 63 | 63 | 63 |
| 3,3'-bis(triethoxysilylpropyl)disulfide | 5.4 | 5.4 | 5.4 | 5.4 | 5.4 | 5.4 | 5.4 | 5.4 |
| Oil | 42.5 | 42.5 | 42.5 | 42.5 | 42.5 | 42.5 | 42.5 | 42.5 |
| Wax | 1.5 | 1.5 | 1.5 | 1.5 | 1.5 | 1.5 | 1.5 | 1.5 |
| Stearic Acid | 1 | 0 | 1 | 0 | 1 | 0 | 1 | 0 |
| N-(1,3 Dimethylbutyl)-N'-Phenyl-P-Phenylene-Diamine | 0.95 | 0 | 0.95 | 0 | 0.95 | 0 | 0.95 | 0 |
| Second Preparatory Mixing Step | | | | | | | | |
| N,N'-Diphenylguanidine | 0 | 1 | 0 | 1 | 0 | 1 | 0 | 1 |
| Final Mixing Step | | | | | | | | |
| Sulfur | 1.6 | 1.6 | 1.6 | 1.6 | 1.6 | 1.6 | 1.6 | 1.6 |
| N,N'-Diphenylguanidine | 1 | 0.4 | 1 | 0.4 | 1 | 0.4 | 1 | 0.4 |
| N-Cyclohexyl-2-benzothiazolesulfenamide | 1.4 | 1.4 | 1.4 | 1.4 | 1.4 | 1.4 | 1.4 | 1.4 |
| 2,2'-Dithiobis(benzothiazole) | 1.4 | 1.4 | 1.4 | 1.4 | 1.4 | 1.4 | 1.4 | 1.4 |
| Stearic Acid | 0 | 1 | 0 | 1 | 0 | 1 | 0 | 1 |
| Zinc Oxide | 2.5 | 2.5 | 2.5 | 2.5 | 2.5 | 2.5 | 2.5 | 2.5 |
| N-(1,3 Dimethylbutyl)-N'-Phenyl-P-Phenylene-Diamine | 0 | 0.95 | 0 | 0.95 | 0 | 0.95 | 0 | 0.95 |
| Polymerized 2,2,4-Trimethyl-1,2-dihydroquinoline | 0.22 | 0.22 | 0.22 | 0.22 | 0.22 | 0.22 | 0.22 | 0.22 |

The rubber compositions had the properties shown in Table 2. Dynamic viscoelastic mechanical property determinations for E' and tangent delta were made by temperature sweep tests conducted at a frequency of 52 Hz using 0.2% strain for temperatures from −50° C. to −6° C. and using 1.0% strain for temperatures from −5° C. to 60° C. The specimens used for dynamic viscoelastic testing were cured for 15 minutes at 170° C., and had the following dimensions: 40 mm long, 4.7 mm wide, and 2 mm thick.

TABLE 2

|  | A | A' | B | B' | C | C' | D | D' |
|---|---|---|---|---|---|---|---|---|
| Average Tg of Polymers (° C.) | −40.8 | −40.8 | −50.2 | −50.2 | −55.2 | −55.2 | −60.8 | −60.8 |
| E' @ −20° C. (MPa) | 223.8 | 180.0 | 120.9 | 81.8 | 94.5 | 48.6 | 67.7 | 36.7 |
| E' @ 0° C. (MPa) | 29.3 | 17.6 | 25.5 | 14.2 | 24.8 | 11.4 | 21.8 | 11.4 |
| Tangent Delta @ 0° C. | 0.541 | 0.628 | 0.442 | 0.489 | 0.399 | 0.419 | 0.356 | 0.358 |
| E' @ 30° C. (MPa) | 13.1 | 7.3 | 13.2 | 7.1 | 13.7 | 6.3 | 12.8 | 7.0 |
| Tangent Delta @ 30° C. | 0.277 | 0.244 | 0.262 | 0.226 | 0.255 | 0.202 | 0.244 | 0.202 |
| E' @ 60° C. (MPa) | 9.2 | 5.3 | 9.5 | 5.4 | 10.1 | 4.9 | 9.6 | 5.5 |
| Tangent Delta @ 60° C. | 0.186 | 0.149 | 0.184 | 0.147 | 0.182 | 0.138 | 0.180 | 0.143 |

Table 3 shows the percent change of E' @−20° C. for A' vs. A, B' vs. B, C' vs. C, and D' vs. D.

TABLE 3

|  | A' vs. A | B' vs. B | C' vs. C | D' vs. D |
|---|---|---|---|---|
| % Change in E' @ −20° C. | −20 | −32 | −49 | −46 |

As can be seen from Tables 2 and 3, the addition of a vulcanization accelerator in a preparatory mixing step unexpectedly has a much larger affect on the E' @ −20° C. when the rubber composition has an average polymer Tg of −55° C. or lower. If the rubber composition is used as a tire tread, the larger reduction in E' @ −20° C. is indicative that the addition of a vulcanization accelerator in a preparatory mixing step to a rubber composition having an average polymer Tg of −55° C. or less will result in a greater improvement in snow traction.

The description has been provided with exemplary embodiments. Modifications and alterations may occur to others upon reading and understanding the preceding detailed description. It is intended that the disclosure and exemplary embodiments be construed as including all such modifications and alterations insofar as they come within the scope of the appended claims or the equivalents thereof.

What is claimed is:

1. A method of preparing a tire tread rubber composition comprising:
   a. blending in at least one preparatory mixing step
      (i) at least one natural or synthetic rubbery polymer selected from the group consisting of natural rubber, synthetic polyisoprene rubber, styrene-butadiene rubber (SBR), polybutadiene, and mixtures thereof and wherein the at least one natural or synthetic rubbery polymer contains no butadiene-isoprene rubber but includes at least styrene-butadiene rubber,
      (ii) a silica filler and a carbon black filler wherein the carbon black filler is present in an amount of 5 to 100 phr,
      (iii) one silica coupling agent wherein the only one silica coupling agent is selected from the group consisting of organosilane polysulfides selected from the group consisting of 3,3'-bis(trimethoxysilylpropyl)disulfide, 3,3'-bis(triethoxysilylpropyl)disulfide, 3,3'-bis(tributoxysilylpropyl)disulfide, 3,3'-bis(trihexoxysilylpropyl)disulfide, 3,3'-bis(tri-t-butoxysilylpropyl)disulfide, 3,3'-bis(dimethylmethoxysilylethyl)disulfide, 3,3'-bis(diphenylcyclohexoxysilylpropyl)disulfide, 3,3'-bis(ethyldi-secbutoxysilylpropyl)disulfide, 3,3'-bis(propyldiethoxysilylpropyl)disulfide, 12,12'-bis(triisopropyloxysilyldodecyl)disulfide, 3,3'-bis(dimethoxyphenylsilylpropyl)disulfide, organoalkoxymercaptosilanes, and capped organoalkoxymercaptosilanes, (iv) an oil, and (v) at least one vulcanization accelerator in an amount of about 1 to 3 phr, wherein the only vulcanization accelerator(s) is selected from the group consisting of guanidine-based vulcanization accelerators, wherein no preparatory mixing step adds elemental sulfur, a thiocarbamate-based compound, a benzothiazole-based compound, a thiuram sulfide-based compound, or 4,4-dithiodimorpholine (DTDM) and the at least one vulcanization accelerator is either added in a preparatory mixing step that includes oil or in a separate preparatory mixing step after (i), (ii), (iii) and (iv); and b. subsequently blending therewith in a final mixing step a sulfur curative selected from the group consisting of elemental sulfur and sulfur donating compounds and 2.5 phr of zinc oxide, wherein the average glass transition temperature of the at least one natural or synthetic rubbery polymer(s) is −55.2° C. to about −61° C., and wherein the only ingredient used to couple the silica filler to the at least one natural or synthetic rubbery polymer consists of (iii) and the only ingredient used to catalyze the reaction between the silica coupling agent and the at least one natural or synthetic rubbery polymer consists of (v).

2. The method of claim 1, wherein the at least one vulcanization accelerator is used in an amount of about 1 phr.

3. The method of claim 1, wherein the ingredient of (iii) is selected from the group consisting of organosilane polysulfides selected from the group consisting of 3,3'-bis(trimethoxysilylpropyl)disulfide, 3,3'-bis(triethoxysilylpropyl)disulfide, 3,3'-bis(tributoxysilylpropyl)disulfide, 3,3'-bis(trihexoxysilylpropyl)disulfide, 3,3'-bis(tri-t-butoxysilylpropyl)disulfide, 3,3'-bis(dimethylmethoxysilylethyl)disulfide, 3,3'-bis(diphenylcyclohexoxysilylpropyl)disulfide, 3,3'-bis(ethyldi-secbutoxysilylpropyl)disulfide, 3,3'-bis(propyldiethoxysilylpropyl)disulfide, 12,12'-bis(triisopropyloxysilyldodecyl)disulfide, and 3,3'-bis(dimethoxyphenylsilylpropyl)disulfide.

4. The method of claim 1, wherein the at least one natural or synthetic rubbery polymer includes natural rubber.

5. The method of claim 1, wherein the silica coupling agent consists of 3,3'-bis(triethoxysilylpropyl)disulfide.

6. The method of claim 1, wherein the preparatory mixing step containing the vulcanization accelerator is mixed to a temperature of about 140° C. to about 190° C.

7. The method of claim 1, wherein the at least one vulcanization accelerator is 1,3-diphenylguanidine.

8. The method of claim 1, wherein the silica filler is present in an amount of 5 to 80 phr.

9. The method of claim 1, wherein the blending of (a) includes carbon black in an amount of 5 to 30 phr.

10. The method of claim 9, wherein the silica filler and carbon black are present at a ratio of 1:1 to 10:1, based on phr.

11. The method of claim 1, wherein the at least one vulcanization accelerator is added in a separate preparatory mixing step after addition of (i), (ii), (iii), and (iv).

12. The method of claim 1, wherein the rubber composition includes one or more of: (v) processing aid(s), (vi) fatty acid(s), and (vii) antidegradant(s), and (v), (vi) and (vii) are added in a subsequent mixing stage to the preparatory mixing stage containing the at least one vulcanization accelerator.

13. The method of claim 1, wherein the sulfur curative is elemental sulfur.

14. A method of preparing a tire tread rubber composition comprising:

a. blending in at least one preparatory mixing step (i) at least one natural or synthetic rubbery polymer selected from the group consisting of natural rubber, synthetic polyisoprene rubber, styrene-butadiene rubber (SBR), and mixtures thereof and wherein the at least one natural or synthetic rubbery polymer contains no butadiene-isoprene rubber but includes at least styrene-butadiene rubber, (ii) a silica filler and a carbon black filler wherein the carbon black filler is present in an amount of 5 to 100 phr, (iii) one silica coupling agent wherein the only one silica coupling agent is selected from the group consisting of organosilane polysulfides selected from the group consisting of 3,3'-bis(trimethoxysilylpropyl)disulfide, 3,3'-bis(triethoxysilylpropyl)disulfide, 3,3'-bis(tributoxysilylpropyl)disulfide, 3,3'-bis(trihexoxysilylpropyl)disulfide, 3,3'-bis(tri-t-butoxysilylpropyl)disulfide, 3,3'-bis(dimethylmethoxysilylethyl)disulfide, 3,3'-bis(diphenylcyclohexoxysilylpropyl)disulfide, 3,3'-bis(ethyldi-secbutoxysilylpropyl)disulfide, 3,3'-bis(propyldiethoxysilylpropyl)disulfide, 12,12'-bis(triisopropyloxysilyldodecyl)disulfide, and bis(dimethoxyphenylsilylpropyl)disulfide, organoalkoxymercaptosilanes, and capped organoalkoxymercaptosilanes, (iv) an oil, and (v) at least one vulcanization accelerator in an amount of about 1 to about 3 phr, wherein the only vulcanization accelerator(s) is selected from the group consisting of guanidine accelerators and includes 1,3-diphenyl guanidine, wherein no preparatory mixing step adds elemental sulfur, a thiocarbamate-based, a benzothiazole-based, a thiuram sulfide-based compound, or 4,4-dithiodimorpholine (DTDM) and the at least one vulcanization accelerator is either added in a preparatory mixing step that includes oil or in a separate preparatory mixing step after (i), (ii), (iii) and (iv); and b. subsequently blending therewith in a final mixing step a sulfur curative selected from the group consisting of elemental sulfur and sulfur donating compounds and 2.5 phr of zinc oxide, wherein the average glass transition temperature of the at least one natural or synthetic rubbery polymer(s) is −55.2° C. to about −61° C., and wherein the only ingredient used to couple the silica filler to the at least one natural or synthetic rubbery polymer consists of (iii) and the only ingredient used to catalyze the reaction between the silica coupling agent and the at least one natural or synthetic rubbery polymer consists of (v).

\* \* \* \* \*